(No Model.)
J. S. BAKER.
FERTILIZER DISTRIBUTER FOR GRAIN DRILLS.
No. 250,773. Patented Dec. 13, 1881.
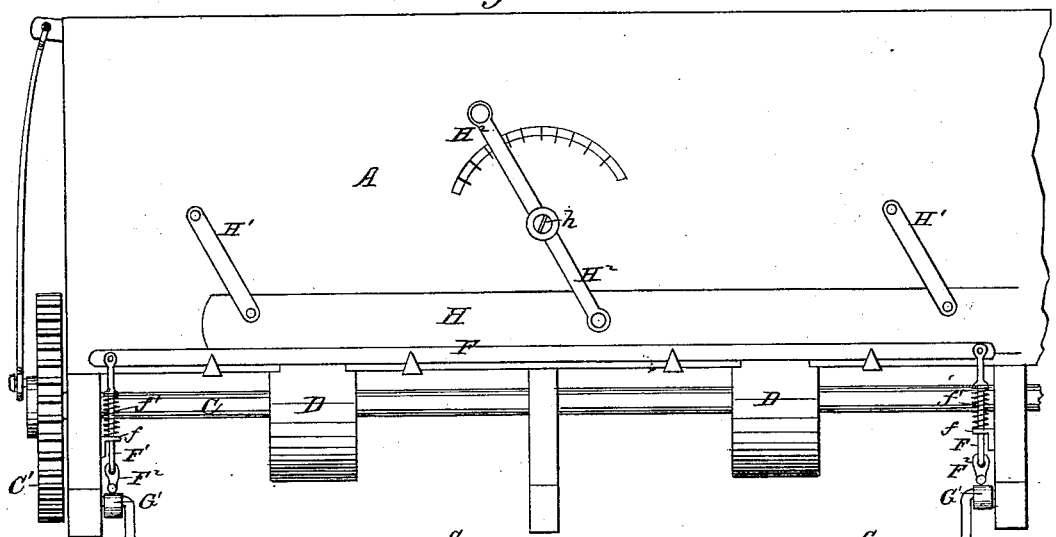
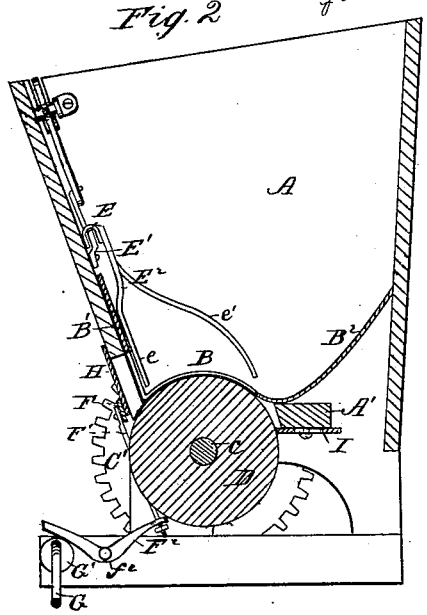
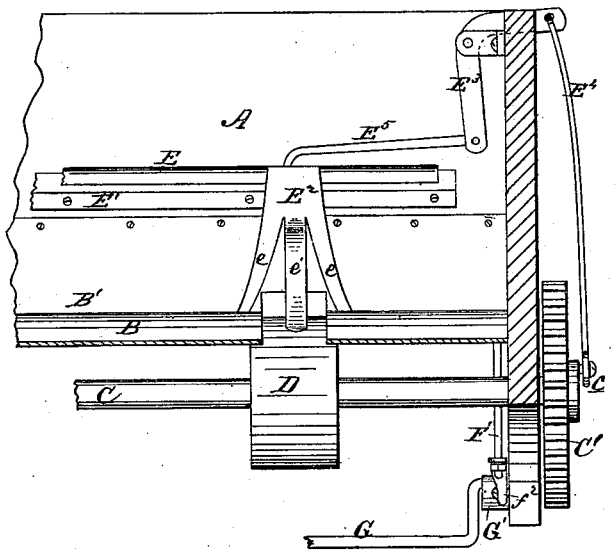
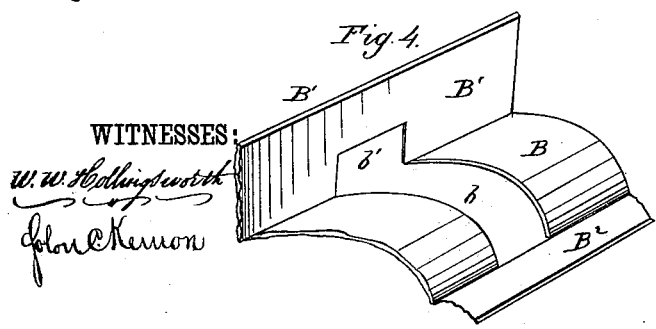
WITNESSES:
W. W. Hollingsworth
John C. Kenon
INVENTOR:
Jacob S. Baker,
BY
ATTORNEYS.
N. PETERS, Photo-Lithographer, Washington, D. C.

UNITED STATES PATENT OFFICE.

JACOB S. BAKER, OF NEW FREEDOM, PENNSYLVANIA.

FERTILIZER-DISTRIBUTER FOR GRAIN-DRILLS.

SPECIFICATION forming part of Letters Patent No. 250,773, dated December 13, 1881.

Application filed July 26, 1881. (No model.)

*To all whom it may concern:*

Be it known that I, JACOB S. BAKER, of New Freedom, in the county of York and State of Pennsylvania, have invented a new and Improved Fertilizer-Distributer for Grain-Drills; and I do hereby declare that the following is a full, clear, and exact description of the same.

My invention is an improvement in fertilizer attachments for grain-drills; and it consists in certain means for operating the valve that controls the discharge from the hopper, as hereinafter described.

In the accompanying drawings, Figure 1 is a rear elevation of the hopper of a fertilizer attachment for grain-drills, showing its valve-connections; Fig. 2, a longitudinal section, and Fig. 3 a transverse section through the hopper; and Fig. 4, a detachable plan view of one of the rollers and a part of the bottom of the hopper with the adjustable scraper attached.

My invention may be applied to the frame in the rear of the grain-hopper of a grain-drill of ordinary construction.

The walls of the hopper A are of well-known construction, and are attached to the frame of the machine in a well-known way. The bottom of the hopper is made of a sheet-metal plate, B, and is formed of a flat-surfaced portion, B', to be attached to the rear wall of the hopper, and a portion, B, curved to the arc of a circle, to form the bottom of the hopper, and an inclined portion, B², that affords means for attaching the bottom plate to the front wall of the hopper. A shaft, C, with a gear-wheel, C', upon one end, that is driven from the main gearing in a suitable manner, is journaled in the end walls or framing of the hopper, so that the shaft C will be held horizontally at a suitable distance below the bottom of the hopper A. Feed-rollers D, of a radius corresponding with the radius of the arc of the curved portion of the bottom plate, B, fit closely against the under side of the curved bottom, so that the said bottom plate will encompass a considerable portion of the periphery of the feed-rollers. The bottom plate is cut away to form a rectangular opening, $b$, of a width slightly less than the width of the feed-roller, so that a portion of the periphery of such rollers will be exposed to contact with the material in the hopper, and the outer portion or edges of the rollers will form a close joint with the bottom plate, to prevent the material from escaping between them. The opening $b$ in the curved bottom is extended to a suitable height upon the plane portion B' of the bottom plate, so that a rectangular discharge-opening, $b'$, is located in the bottom of the hopper, at the angle between the curved portion B² on the rear wall of the hopper, immediately over the path of the periphery of the feed-roller. By this means it will be readily seen that the exposed portion of the feed-roller will draw and convey the material resting upon it toward and through the discharge-opening in a regular and effectual manner.

In order to keep the discharge-opening at all times perfectly clear of obstructions, and also stir the material and prevent it from clogging and arching over the feed-wheels, a horizontal rod, E, is reciprocated longitudinally of the hopper, and is held upon a guide-plate, E', to slide closely against the rear wall of the hopper, and has secured to it a series of plates, E², equal in number to the discharge-openings, that are provided with vertically-depending fingers $e\ e$, of metal, which will bear closely against the metal portion B' of the rear wall, so that they will sweep the discharge-openings to clear them and scrape the edges of the openings to prevent their being gummed up, and the accuracy of the discharge thereby impaired. The plates E² are also provided with fingers $e'$, that are bowed across the bottom of the hopper, immediately above the exposed portion of the feed-rollers, to stir the phosphate, and prevent its clogging and arching above the opening in the bottom of the hopper.

The horizontal grooved rod or bar E, to which the stirrer and clearing fingers are attached, is reciprocated in the hopper upon the guide-plate E' by means of a bell-crank lever, E³, pivoted to the hopper, and connecting-rod E⁴, secured at one end to a crank, $c$, upon the gear C', and at the other end to one of the arms of the bell-crank lever. The other arm of the bell-crank lever, being connected by link E⁵ with the rod E, will reciprocate it. By this means every revolution of the feed-wheels will draw the stirrer and scraper fingers back and forth across the discharge-opening.

In order to clear the discharge-opening when the drill is not in operation at the same time that the drills are raised from the ground, and by one and the same operation, a discharge-valve, F, is arranged to slide vertically in guides against the back of the rear wall of the hopper, and is connected at its ends to rods F', held to the frame by guide-plates f, between which and a collar upon the rods a coiled spring encompassing the rod is placed, the tendency of which is to hold the rods F' and valve F in their raised position to uncover the discharge-opening. The lower ends of the rods F' are connected to one end of a lever, F², pivoted at its middle portion, f², to the frame, and operated upon by a cam, G', upon the ends of a swinging lever, G, bent at both ends and hinged to the opposite sides of the machine, and which is usually employed for raising and lowering the drills by means of chains g, that connect them, so that when the lever G is raised to lift the drills above the ground the cam G' will operate upon the lever F² and rods F', to draw down the valve F and close the discharge-opening.

A regulating-gate, H, is arranged to extend the entire length of the hopper, at the outer rear side thereof, and is suspended by links H' from the said hopper, so that its lower edge will swing equally across the discharge-openings, and when moved from side to side will expose a greater or less area of the discharge-openings. The gate is operated upon by a hand-lever, H², pivoted at h to the hopper, and connected at its lower end to the gate, so that its upper end is free and will afford convenient means for working the valve. Segmental lines are formed upon the hopper in the path of the lever H², and are graduated to indicate the amount of the exposed area of the discharge-opening, the said graduations being such as to indicate the number of pounds to the acre of the fertilizer that may be allowed to pass through the discharge-opening. One of the bottom rails, A', of the hopper is arranged to rest very near to the front of the feed-wheels, at a point immediately below the first contact of the periphery of the wheels with the curved portion B² of the bottom plate of the hopper, and a scraper-plate, I, slotted at its ends and held closely against the said rail A' and the periphery of the feed-wheels by set-screws passing through slots in the plates, so that the plates may be adjusted to bear closely against the plane surface of the rollers and scrape them perfectly clean immediately before the said cleaned surface re-enters the hopper.

Any dry fertilizing material may be used with my machine.

The peculiar mode of forming the bottom of the hopper and discharge-opening, and of connecting them with the feed-rollers, will work without clogging or wasting the material by leakage.

It will be understood that a cup or casing should be arranged to inclose the feed-rollers and openings upon the outside of the machine and connect the opening with the grain-spouts.

The simple means described for operating the discharge-valve will insure at all times that the valve is closed when the drills have been raised to turn the machine or leave the field, and the operation is formed with one and the same movement.

What I claim as new is—

In a fertilizer-distributer, the combination, with the valve F, of the connecting-rods F', springs f', arranged upon said rods, lever F², cam G', and oscillating crank-shaft G, carrying said cam, substantially as shown and described.

The above specification of my invention signed by me this 9th day of July, 1880.

JACOB S. BAKER.

Witnesses:
SOLON C. KEMON,
CHAS. A. PETTIT.